United States Patent [19]

Bühler et al.

[11] Patent Number: 5,436,078
[45] Date of Patent: Jul. 25, 1995

[54] STARCH MIXTURE AND PROCESS FOR THE PRODUCTION THEREOF

[75] Inventors: Friedrich S. Bühler, Thusis; Eduard Schmid, Bonaduz; Hans-Joachim Schultze, Chur, all of Germany

[73] Assignee: EMS-Inventa AG, Switzerland

[21] Appl. No.: 957,288

[22] Filed: Oct. 6, 1992

[30] Foreign Application Priority Data

Oct. 8, 1991 [DE] Germany .............. 41 33 335.7

[51] Int. Cl.⁶ .................................. B32B 27/06
[52] U.S. Cl. .................. 428/474.4; 524/47; 524/50; 524/51; 524/53
[58] Field of Search .......... 428/474.4, 479.3; 524/47, 50, 51, 53, 514

[56] References Cited

FOREIGN PATENT DOCUMENTS

| | | |
|---|---|---|
| 327505 | 8/1989 | European Pat. Off. . |
| 0327505 | 9/1989 | European Pat. Off. . |
| 0344118 | 11/1989 | European Pat. Off. . |
| 344118 | 11/1989 | European Pat. Off. . |
| 0404723 | 12/1990 | European Pat. Off. . |
| 0404727 | 12/1990 | European Pat. Off. . |
| 0404728 | 12/1990 | European Pat. Off. . |
| 0407350 | 1/1991 | European Pat. Off. . |
| 0408501 | 1/1991 | European Pat. Off. . |
| 0408502 | 1/1991 | European Pat. Off. . |
| 408503 | 1/1991 | European Pat. Off. . |
| 0408503 | 1/1991 | European Pat. Off. . |
| 0409781 | 1/1991 | European Pat. Off. . |
| 0409782 | 1/1991 | European Pat. Off. . |
| 0409783 | 1/1991 | European Pat. Off. . |
| 0409788 | 1/1991 | European Pat. Off. . |
| 0409789 | 1/1991 | European Pat. Off. . |
| 409789 | 1/1991 | European Pat. Off. . |
| 14938 | 12/1990 | WIPO . |

OTHER PUBLICATIONS

Database WPIL, Week 3692, Derwent Publications AN 92-295716; JPA-4-202,566; Jul. 23, 1992.
Patent Abstracts of Japan, vol. 13, No. 145 (C-583); Apr. 10, 1989 JPA-63-304,061; Dec. 12, 1988.

Primary Examiner—D. S. Nakarani
Assistant Examiner—H. Thi Lê
Attorney, Agent, or Firm—Jordan B. Bierman; Bierman and Muserlian

[57] ABSTRACT

A highly transparent, single-phase biodegradable starch mixture comprising 90 to 1 parts of at least one polyamide and 10 to 99 parts of a starch molding composition, which composition comprises 96 to 46 parts of at least one chemically modified starch and 4 to 40 parts of at least one plasticizer. Preferably, up to 4 parts by weight of at least one additive such as urea, urea derivatives, and emulsifiers are also included; in addition, the starch mixture may contain up to 20 parts by weight of known additives. The invention also relates to a process for producing the highly transparent starch mixture and, in particular, to the use of the starch mixture in thermoplastically shaped parts.

22 Claims, 1 Drawing Sheet

STARCH MIXTURE AND PROCESS FOR THE PRODUCTION THEREOF

The invention relates to a highly transparent, single-phase, biodegradable starch mixture consisting of selected polyamides and a starch molding composition. Preferably, the composition contains one or more emulsifiers, urea, and/or derivatives thereof, as well as chemically modified starch and plasticizer. The invention also relates to a process for producing this highly transparent starch mixture. The invention is used for making thermoplastically shaped parts, in particular films, especially by injection molding, extrusion, co-extrusion, blow molding, injection stamping, and thermo forming.

BACKGROUND OF THE INVENTION

As starch is a vegetable carbohydrate, there have been attempts to use it as a "natural" plastic material in a wide variety of areas, employing known plastics processing methods. However, owing to their granular structure, native starches first have to be destructured before they can become thermoplastically processible.

To impart the good properties known and desired of plastics materials to an opaque basic starch molding composition of this type, it is necessary to process it further. When this is done, it often loses its biodegradability.

EP 344 118 A2 relates to a polymer blend material consisting of a melt of at least one water-containing destructured hydrophilic polymer and at least one synthetic, substantially water-insoluble thermoplastic polymer. The dimensional stability of the material is improved by the addition of the water-insoluble polymer; this is demonstrated by examples of blends based on gelatins, as well as cellulose derivatives, and polyethylene, polystyrene, polyvinylether, polyoxymethylene, and ethylene acrylic acid copolymers. The patent's reference to possible biodegradability, namely the loss of this additional stability after several days, is considered to be a disadvantage for the products shaped from the blends; no comment is made as to the biodegradability of the blend.

EP-OS 327 505 A2 describes a melt-mixed polymer blend consisting of destructurized but chemically unmodified starch and at least one water-insoluble synthetic thermoplastic polymer. Similarly, polymer blend compositions consisting of chemically unmodified destructurized starch and a functionalized polymer are known from the laid open and EP Applications 409 789 A2, 409 788 A2, 409 783 A2, 409 782 A2, 409 781 A1, 408 503 A2, 408 502 A2, 408 501 A2, 407 350 A2, 404 728 A2, 404 723 A2, and 404 727 A2. These compositions may each additionally contain a further water-insoluble thermoplastic polymer. In that case, the functionalized polymer acts as a compatibilizer between the chemically unmodified starch and the additional third thermoplastic polymer.

German Patent Application DE 41 19 915.4 describes starch polymer mixtures consisting of a starch molding composition and selected linear polymers. Their specific disadvantage, as well as that of all starch materials disclosed in the above-mentioned specifications, is their typical yellow tinge as well as their non-transparency. Opaque material can be used only to a limited extent, in particular in the packaging field, as transparency of the plastic materials is usually required.

BRIEF DESCRIPTION OF THE INVENTION

It is, therefore, an object of the invention to provide a highly transparent, biodegradable, single-phase starch mixture for thermoplastic processing which has no yellow tinge and contains no polymeric compatibilizers, and to provide a process for producing this mixture. Furthermore, this starch mixture is to be stable when stored as a granulate, i.e. it must be insensitive to moisture under normal storage conditions, and suitable for the production of highly transparent thermoplastically formed shapes. Of special interest are highly expandable films which are resistant to cold water and have a particularly smooth surface. This starch mixture has application in the production of co-extruded films with further polymers without the addition of adhesives.

DETAILED DESCRIPTION OF THE INVENTION

Surprisingly, it has been found that a highly transparent, single-phase, biodegradable starch mixture may be produced from a starch molding composition which contains chemically modified starch and a selected biodegradable polyamide, without the necessity of a polymeric compatibilizer for thermoplastic processing.

All parts and percentages throughout the specification and claims are by weight unless otherwise stated. The starch mixture according to the invention comprises (a) 10 to 99 parts of at least one starch molding composition which comprises
 (i) 96 to 46 parts of at least one chemically modified starch,
 (ii) 4 to 40 parts of at least one plasticizer, and
 (iii) 0 to 4 parts of at least one additive, in particular selected from urea, urea derivatives, emulsifiers, and mixtures thereof,
 wherein (i), (ii), and (iii) total 100 parts, and
(b) 90 to 1 parts of at least one selected polyamide, wherein components (a) and (b) total 100 parts and
(c) 0 to 20 parts of additives.

The chemically modified starch has a natural water content of 5% to 16%, preferably 5% to 12%, most preferably 6% to 8%. This generally results in a final water content in the highly transparent starch mixture of 2% to 8%, preferably 2% to 5%.

The preferred starch molding composition is produced by a process described in German Patent Application DE 41 17 628.6, wherein a mixture of chemically modified starch having a natural water content, at least one plasticizer, urea and/or urea derivatives, and at least one emulsifier are destructurized at elevated temperatures and pressures in an extruder and are extruded as a melt. Typical emulsifiers are metal stearates, glycerol monostearate, polyoxyethylene(20)-sorbitan monolaurate, polyoxyethylene(20)-sorbitan monopalmitate, polyoxyethylene(40)-stearate, polyoxyethylene(100)-stearate, and mixtures thereof.

One form of the process comprises:
a) introduction of a chemically modified starch into the intake region of an extruder and conveyance thereof in a downstream direction,
b) addition of a pre-homogenized mixture of liquid anhydrous plasticizer, emulsifier, and any desired additives, mixing thereof with the starch while continuing to convey the combined starch and mixture downstream,
c) destructurization of the starch granules without addition of extraneous water, and complete plasticization of the mixture to form a homogeneous, thermoplastically processible melt, and conveying the melt downstream to a degasification chamber, d) degasification of the melt and further conveyance thereof to an extrusion chamber, e) extrusion of the melt through a die.

The material being processed is exposed to elevated temperatures in b) to e), reduced pressure in d), and elevated pressure in e).

As a modification of the foregoing process, the chemically modified starch and plasticizer are separately introduced into the intake region of the extruder. They are mixed and conveyed to the next chamber into which a pre-homogenized mixture of the emulsifier and the additives is introduced. All of the ingredients are blended to form the mixture of starch, plasticizer, emulsifier, and additives. The remainder of the process is the same as that described above.

The chemically modified starch is produced by reaction of the OH groups of the original starch with alkylene oxides or other ether-, ester-, urethane-, and/or carbamate-forming substances. Hydroxy alkyl of 2 to 6 carbon atoms, acetyl, and carbamate starches or mixtures thereof are preferred. The degree of substitution of the chemically modified starch is 0.01 to 0.2 and the amylose content is 20% to 100% by weight, particularly preferably 50% to 100% by weight.

The plasticizer is an organic compound containing at least 1 hydroxyl group, preferably a polyol, most preferably sorbitol, mannitol, D-glucose, ethylene glycol, polyethylene glycol, propylene glycol, or mixtures thereof. It is used in amounts of 4 to 40 parts, preferably 9 to 40 parts, most preferably 10 to 30 parts, per 100 parts of the modified starch molding composition. One or more additives are introduced totaling 0 to 4 parts per 100 parts of starch molding composition. Urea, urea derivatives, and/or emulsifiers are preferred. The urea or urea derivatives, if used, are present in amounts of 0.1 to 2 parts, preferably 0.1 to 1 part, most preferably about 1 part, per 100 parts of starch molding composition.

The emulsifier has a hydrophilic-lipophilic balance of 0 to 20, preferably 10 to 20 and, if used, is in amounts of 0.1 to 1 parts, preferably about 0.2 parts, per 100 parts of starch molding composition. Suitable emulsifiers include metal stearates, glycerol monostearates, polyoxyethylene(20)-sorbitane monolaurate, polyoxyethylene(20)-sorbitane monopalmitate, polyoxyethylene(40)-stearate, and/or polyoxyethylene(100)-stearate.

In a preferred embodiment, component (a) consists of 70 parts of hydroxyethyl and/or hydroxypropyl starch (having a degree of substitution of 0.06 and an amylose content of 50%), 15 parts of glycerol, 13.8 parts of sorbitol, 1 part of urea, and 0.2 parts of magnesium stearate.

Aliphatic polyamides having melting or softening points of 50° C. to 160° C., and melt flow indices (MFI) of 100 to 5000 Pa.s (at 160° C. and 21.2 N), are suitable as (b). Of particular interest are homopolyamides and/or copolyamides of at least one of ω-aminocaproic acid, ω-aminoenanthic acid, ω-aminocaprylic acid, ω-aminopelargonic acid, ω-aminocapric acid, ω-aminoundecylic acid, ω-aminolauric acid, caprolactam, lactam-7, lactam-8, lactam-9, lactam-10, lactam-11, and laurolactam have been found to be suitable. Also, worthy of special mention are homo- and/or copolyamides of methylene diamine, dimethylene diamine, trimethylene diamine, tetramethylene diamine; pentamethylene diamine, and hexamethylene diamine with oxalic acid, malonic acid, succinic acid, glutaric acid, adipic acid, pimelic acid, suberic acid, azelaic acid, sebacic acid, nonanedicarboxylic acid, decanedicarboxylic acid, undecanedioic acid, and dodecanedioic acid. Polyamides based on caprolactam, laurolactam, ω-aminolauric acid, ω-aminocaproic acid, hexamethylene diamine with adipic acid, and mixtures thereof are preferred.

Optical brighteners, stabilizers, antioxidants, flame proofing agents, dyes, fillers, processing aids, and the like are also used as additives in amounts of 0 to 20 parts per 100 parts of starch mixture. The additives may be introduced either during the production of the starch mixture or preferably to (a) and/or (b).

In another preferred embodiment, the single-phase starch mixture according to the invention contains 50 to 95 parts of (a), 50 to 5 parts of (b); 70 to 95 parts of (a) and 30 to 5 parts of (b) are particular preferred. The transparency of the starch mixture according to the invention is generally proof that it is a single phase.

The process for producing the highly transparent starch mixture according to the invention comprises fusion of (a) and (b) in a ratio of 10/90 to 99/1 in an extruder or an injection molding machine. The temperatures are not higher than 10° C. below the decomposition point of the starch and not lower than 50° C. above the melting or softening point of the polyamide.

The starch mixture according to the invention can be further processed into highly transparent, thermoplastically shaped parts. It is preferred that a granulate first be produced; it is then used for the manufacture of shaped articles. These may be formed by injection molding, blow molding, extrusion, co-extrusion, injection stamping, or thermo-forming. The production of mono- or co-extruded films as flat or blown films is particularly preferred.

There are many advantages of the starch mixtures according to the invention and shaped articles produced from it; they include 1. High transparency
2. Very smooth surfaces, free from exudation marks
3. Single phase compatibility without need of a polymeric compatibilizer
4. Biodegradability
5. Good tensile strength and elongation at break
6. Low moisture uptake from the air; therefore the granulates are stable in storage
7. Simple processing into films and co-extruded films without a tendency to block formation and tackiness.
8. Good adhesion of the co-extruded film layers without addition of an adhesive
9. High expandability
10. Welding of the films using conventional heat sealing devices
11. Anti-static behavior
12. Printability using water soluble dyes For the production of the co-extruded films consisting of layers of the transparent starch mixture and layers of further polymers, these further polymers should have a melting or softening point of 50° C. to 160° C. Polyamides, polyesters, polyolefins, and mixtures thereof are suitable for this purpose. Polyolefins selected from polyethylene, polypropylene, polybutylene, and derivatives thereof are preferred. Polyethylene and its derivatives are particularly preferred.

In another specific embodiment, the highly transparent starch mixture forms the middle layer and the further polymer(s) form the upper and lower layers of the co-extruded film. The starch mixture layer may also appear several times in the case of more than three film layers. In further embodiments of the co-extruded film, the highly transparent starch mixture may also form the upper and/or lower layer.

All films or sheets may be produced in a thickness of 20 to 500 μm, preferably 50 to 100 μm. They are suitable, for example, for carrier bags, sacks, refuse bags, agricultural films, diaper covering films, and for biologically degradable films and sheets of any type. Furthermore, all films may be subjected to thermoplastic forming processes such as deep drawing.

Figure 1:
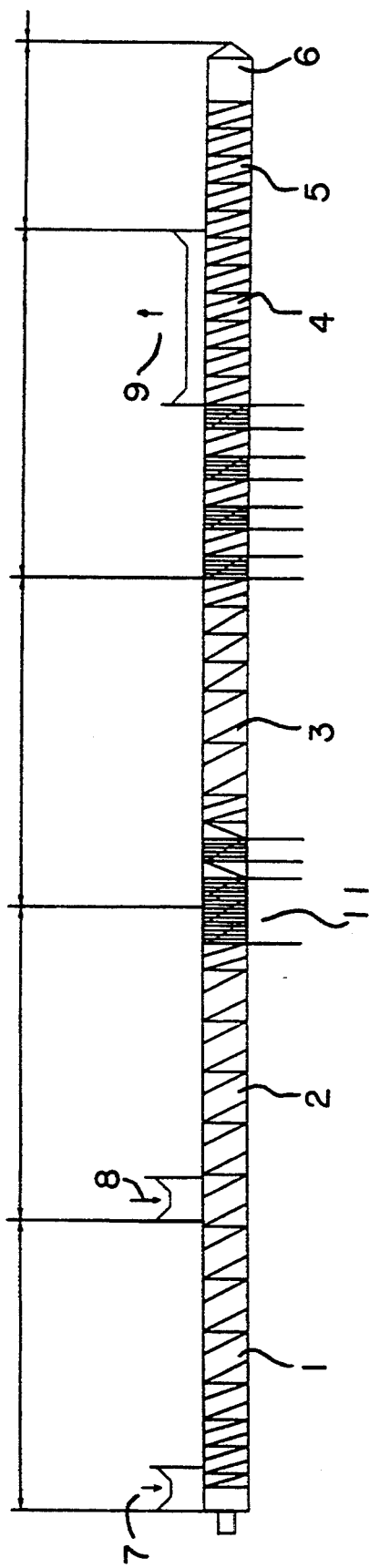
FIG. 1 is a schematic view of an extruder for use in connection with the present invention.

The following examples illustrate the invention without restricting it. All percentages, unless otherwise stated, are based on the total mixture of starting materials.

I. Production of the Starch Molding Composition [Component (a)]

Example 1a

A starch molding composition was produced from 70 parts of hydroxypropyl cornstarch (having a degree of substitution of 0.06 and an amylose content of 50%), 15 parts of glycerol, 12.8 parts of sorbitol, 2 parts of urea, and 0.2 parts of magnesium stearate by the process described hereinafter, and was subsequently granulated.

Extruder data:
a) Heating zones:
(1) Room temperature
(2) 130° C.
(3) 130° C.
(4) 100° C.
(5) 100° C.
(6) 150° C.
b) Pressure zone (6): 30–40 bar
c) Torque: 70%
d) Vacuum: −0.4 bar 70 parts of hydroxypropyl cornstarch, having a degree of substitution of 0.06 and an amylose content of 50%, and 12.8 parts of sorbitol were introduced separately at point 7 in FIG. 1 into the intake region (heating zone 1) of a co-rotating, intermeshing, twin screw extruder; the extruder (shown in FIG. 1) has a screw length to diameter ratio of 41. The starting materials were simultaneously mixed and conveyed to heating zone 2. At a temperature of 60° C., 0.2 parts of magnesium stearate were dissolved with 2 parts of urea in 15% by weight of glycerol. This pre-homogenized mixture of plasticizer, emulsifier, and additives was introduced into the extruder (heating zone 2) at point 8 in FIG. 1, and simultaneously mixed and conveyed onto heating zone 3. After destructurizing of the starch granules and complete plasticization of the starch mixture in the kneading chamber 11 (see heating zones 2 and 3) to form a homogeneous melt, the melt was degasified by application of a vacuum at point 9 in FIG. 1 (heating zone 4). After passing through heating zone 5, the homogeneous, thermoplastically processible starch melt was extruded through a die in heating zone (6) as a strand having low strand expansion (die: 3 mm, strand: 4 mm), cooled, and granulated.

Example 1b

The same procedure as in Example 1a was followed except for a urea content of 1 part and a sorbitol content of 13.8 parts.

II. Production of the Biologically Degradable, Single-phase Highly Transparent Starch Mixture

Comparison Examples 2 to 12 and Examples 13 to 24 According to the Invention The starch granulate from Example 1a or 1b was mixed with the granulate of polyamide (b) and was introduced into the metering zone of a twin screw extruder ZSK-30 (made by Werner & Pfleiderer) with 6 heating zones. Speed and throughput were 100 rpm and 8 to 10 kg/h respectively. The production parameters are set forth in Table 1 and the material properties of the resultant starch mixtures are shown in Table 2.

The melt viscosities of the polyamides (b) were determined at 160° C. and 21.2 N in accordance with DIN 53 735. The melt viscosities of the starch mixtures were measured at 160° C. and 236.4 N by a modified melt flow index method. The water content was determined by the Karl-Fischer method in accordance with DIN 53 714, and the melting point by differential calorimetry in the dry state at a heating rate of 20° C./min in a Du Pont Thermal Analyzer, type 1091B. The mechanical properties were determined in the dry state by means of injection molded test rods according to DIN 53 457 (elongation modulus) and DIN 53 455 (tensile strength and elongation at break). The resistance to moisture was determined in cold water by measuring the swelling. For this purpose, pieces of film measuring 100 cm$^2$ were left in cold water for one hour and their water uptake was then determined by weight measurement. The dissolution of the starch mixtures in hot water is a condition for their biological degradability.

The following commercial products were used in the Examples and Comparison Examples:

Grilon CF 62 BSE is a copolyamide based on the monomers of polyamide 6 and polyamide 6.9 made by EMS-CHEMIE and having a melting point of about 136° C.

Grilon CR 9 is a copolyamide based on the monomers of polyamide 6 and polyamide 12 made by EMS-CHEMIE and having a melting point of about 200° C.

Grilon CA 6E is a copolyamide based on the monomers of polyamide 6 and polyamide 12 made by EMS-CHEMIE and having a melting point of about 130° C.

Grilamid ELY 60 is a copolyamide made by EMS-CHEMIE, based on lactam-12, polyether diamine, and dimerized fatty acid, and having a melting point of about 160° C.

Griltex 1 is a copolyamide made by EMS-CHEMIE, based on the monomers of polyamide 6, polyamide 12, and polyamide 6.6, having a melting point of about 110° C. and a melt viscosity (DIN 53 735) of about 600 Pa.s (21.2 N/160° C.).

Griltex 2 is a copolyamide made by EMS-CHEMIE, based on the monomers of polyamide 6, polyamide 12, and polyamide 6.6, having a melting point of about 125° C. and a melt viscosity (DIN 53 735) of about 400 Pa.s (21.2 N/160° C.).

Griltex 3 is a copolyamide made by EMS-CHEMIE, based on the monomers of polyamide 6, polyamide 12, and polyamide 6.6, having a melting point of about 110°

C. and a melt viscosity (DIN 53 735) of about 500 Pa.s (21.1 N/160° C.).

a melting point of about 80° C. and a melt viscosity (DIN 53 735) of about 150 Pa.s (21.2 N/160° C.).

TABLE 1

Production parameters for the highly transparent starch mixtures according to the invention and comparison examples

| | | Polyamide | | | | | | | | | | |
|---|---|---|---|---|---|---|---|---|---|---|---|---|
| Example | Type | Melting[1] Point (°C.) | Melt Viscosity[2] (Pa·s) | Content (Parts by weight) | Starch Type Example | T1 (°C.) | T2 (°C.) | T3 (°C.) | T4 (°C.) | T5 (°C.) | T6 (°C.) | Tm[3] (°C.) |
| 2a + 2* | Grilon CF 62 BSE | 136 | 3100 | 50 | 1a | 0 | 140 | 145 | 145 | 145 | 150 | 167 |
| 3* | Grilon CF 62 BSE | 136 | 3100 | 40 | 1a | 0 | 140 | 145 | 145 | 145 | 150 | 163 |
| 4* | Grilon CF 62 BSE | 136 | 3100 | 30 | 1a | 0 | 140 | 145 | 145 | 145 | 150 | 161 |
| 5* | Grilon CF 62 BSE | 136 | 3100 | 20 | 1a | 0 | 140 | 145 | 145 | 145 | 150 | 157 |
| 6* | Grilon CF 62 BSE | 136 | 3100 | 10 | 1a | 0 | 140 | 145 | 145 | 145 | 150 | 165 |
| 7* | Grilon CR 9 | 200 | — | 50 | 1a | 0 | 210 | 230 | 230 | 230 | 240 | 235 |
| 8* | Grilon CA 6E | 130 | 3600 | 50 | 1a | 0 | 140 | 140 | 140 | 140 | 150 | 165 |
| 9* | Grilamid ELY 60 | 160 | — | 50 | 1a | 0 | 150 | 170 | 150 | 150 | 170 | 179 |
| 10* | Grilamid ELY 60 | 160 | — | 30 | 1a | 0 | 150 | 170 | 150 | 150 | 170 | 180 |
| 11* | Grilamid ELY 60 | 160 | — | 10 | 1a | 0 | 150 | 170 | 150 | 150 | 170 | 178 |
| 12* | Grilamid ELY 60 | 160 | — | 5 | 1a | 0 | 150 | 170 | 150 | 150 | 170 | 179 |
| 13 | Griltex 1 | 110 | 600 | 50 | 1a | 0 | 150 | 150 | 130 | 130 | 150 | 151 |
| 14 | Griltex 1 | 110 | 600 | 40 | 1b | 0 | 150 | 150 | 130 | 130 | 150 | 145 |
| 15 | Griltex 1 | 110 | 600 | 30 | 1b | 0 | 150 | 150 | 130 | 130 | 150 | 147 |
| 16 | Griltex 1 | 110 | 600 | 20 | 1b | 0 | 150 | 150 | 130 | 130 | 150 | 149 |
| 17 | Griltex 1 | 110 | 600 | 50 | 1b | 0 | 150 | 150 | 130 | 130 | 150 | 147 |
| 18 | Griltex 1 | 110 | 600 | 10 | 1b | 0 | 150 | 150 | 130 | 130 | 150 | 153 |
| 19 | Griltex 1 | 110 | 600 | 5 | 1b | 0 | 150 | 150 | 130 | 130 | 150 | 153 |
| 20 | Griltex 2 | 125 | 400 | 50 | 1b | 0 | 150 | 150 | 130 | 130 | 150 | 150 |
| 21 | Griltex 2 | 125 | 400 | 20 | 1b | 0 | 150 | 150 | 130 | 130 | 150 | 153 |
| 22 | Griltex 3 | 110 | 500 | 50 | 1b | 0 | 150 | 150 | 130 | 130 | 150 | 143 |
| 23 | Griltex 4 | 110 | 100 | 50 | 1b | 0 | 150 | 150 | 130 | 130 | 150 | 143 |
| 24 | Griltex 5 | 80 | 150 | 50 | 1b | 0 | 120 | 100 | 100 | 100 | 130 | 125 |

*Comparison examples
[1]Melting point according to DSC
[2]Melt viscosity at 160° C. and 21.2 N according to DIN 53 735
[3]Tm = Melt temperature

TABLE 2

Material properties of highly transparent starch mixtures according to invention and comparison examples

| Example | Water[1] (% by weight) | Melting[2] Point (°C.) | Melt[3] Viscosity (Pa·s) | Modulus[4] of Elasticity (N/mm²) | Tensile[5] strength at break (N/mm²) | Elongation[6] at break (%) | Cold water swelling (%) | Hot water dissolutn. | Transparency | Colour |
|---|---|---|---|---|---|---|---|---|---|---|
| 2a | 11.6 | — | 259 | 78 | 10.5 | 434 | max. 10 | Yes | No | + |
| 2* | 4.4 | 107 | 1867 | 254 | 21.1 | 404 | max. 10 | Yes | No | + |
| 3* | 2.2 | 111 | 4508 | 499 | 17.5 | 221 | max. 10 | Yes | No | + |
| 4* | 1.8 | 115 | 6500 | 1038 | 26.6 | 4 | max. 10 | Yes | No | 0 |
| 5* | 1.6 | 113 | 8000 | 1393 | 30.4 | 3 | max. 10 | Yes | No | 0 |
| 6* | — | — | — | — | — | — | Dissolutn. | Yes | No | 0 |
| 7* | — | — | — | — | — | — | — | — | No | — |
| 8* | — | — | — | — | — | — | — | — | No | + |
| 13 | 5.5 | 143 | 215 | 117 | 14.6 | 434 | max. 10 | Yes | Good | + |
| 14 | 7.65 | 145 | 255 | 71 | 13.0 | 520 | max. 10 | Yes | Good | ++ |
| 15 | 7.57 | 147 | 275 | 110 | 9.6 | 355 | max. 10 | Yes | Very good | ++ |
| 16 | 8.11 | 149 | 271 | 89 | 6.4 | 220 | 10–20 | Yes | Very good | ++ |
| 17 | 5.59 | 147 | 263 | — | — | — | max. 10 | Yes | Good | ++ |
| 18 | 4.60 | 165 | 2840 | 190 | 9.3 | 64 | Dissolutn. | Yes | Very good | ++ |
| 19 | 4.43 | 163 | 3575 | 160 | 8.2 | 65 | Dissolutn. | Yes | Good | 0 |
| 20 | 7.60 | 146 | 265 | 75 | 14.0 | 510 | max. 10 | Yes | Very good | ++ |
| 21 | 8.05 | 148 | 283 | 92 | 7.5 | 210 | Dissolutn. | Yes | Good | ++ |
| 22 | — | — | — | — | — | — | max. 10 | Yes | Good | ++ |
| 23 | — | — | — | — | — | — | max. 10 | Yes | No | ++ |
| 24 | — | — | — | — | — | — | max. 10 | Yes | No | ++ |

*Comparison examples
[1]Final water content according to DIN 53 714
[2]Melting point according to DSC
[3]Melt viscosity at 160° C. and 236.4 N
[4]Elongation modulus according to DIN 53 457
[5,6]according to DIN 53 455

Griltex 4 is a copolyamide made by EMS-CHEMIE, based on the monomers of polyamide 6, polyamide 12, and polyamide 6.6, and having a melting point of about 110° C. and a melt viscosity (DIN 53 735) of about 100 Pa.s (21.2 N/160° C.).

Griltex 5 is a copolyamide made by EMS-CHEMIE, based on the monomers of polyamide 6, polyamide 12, polyamide 6.6, polyamide 6.9, and polyamide 11, having While only a limited number of specific embodiments of the present invention have been expressly disclosed, it is, nonetheless, to be broadly construed, and not to be limited except by the character of the claims appended hereto.

What we claim is:

1. A highly transparent, single phased and biologically degradable starch mixture comprising
   (a) 10 to 99 parts of a starch molding composition comprising
      (i) 96 to 46 parts of at least one starch chemically modified by reaction of its OH groups with at least one compound selected from the group consisting of alkylene oxides, ether-forming substance, ester-forming substance, urethane-forming substance, carbamate-forming substance, and mixtures thereof,
      (ii) 4 to 40 parts of at least one plasticizer, wherein (i) and (ii) total 100 parts,
   (b) 90 to 1 parts of at least one aliphatic polyamide having a melting point of 50° to 160° C., and
   (c) 0 to 20 parts of additives, the sum of a+b+c being 100 parts.

2. The mixture of claim 1 wherein said additive comprises at least one member of the group consisting of 0.1 to 2 parts of urea and 0.1 to 2 parts of at least one emulsifier.

3. The mixture of claim 2 wherein there are 0.1 to 1 part of said urea.

4. The mixture of claim 2 wherein there are 0.1 to 1 part of said emulsifier.

5. The mixture of claim 4 wherein said emulsifier is a compound having a hydrophilic-lipophilic balance of 0 to 20.

6. The mixture of claim 4 wherein said emulsifier is selected from the group consisting of metal stearates, glycerol monostearate, polyoxyethylene (20)-sorbitan monolaurate, polyoxyethylene-20-sorbitan monopalmitate, polyoxyethylene-40-stearate, polyoxyethylene-100-stearate, and mixtures thereof.

7. The mixture of claim 1 wherein there are 70 to 95 parts of (a) and 30 to 5 parts of (b) present.

8. The mixture of claim 1 wherein said starch has a water content of 5% to 16%.

9. The mixture of claim 1 wherein said chemically modified starch has an amylose content of 20% to 100%.

10. The mixture of claim 1 wherein said chemically modified starch has a degree of substitution of 0.01 to 0.2.

11. The mixture of claim 1 wherein said plasticizer is present in an amount of 9 to 40 parts.

12. The mixture of claim 11 wherein said plasticizer is present in an amount of 10 to 30 parts.

13. The mixture of claim 1 wherein said plasticizer is an organic compound containing at least one hydroxyl group.

14. The mixture of claim 1 wherein component (c) is at least one member selected of the group consisting of optical brighteners, stabilizers, antioxidants, dyes, fillers, flame proofing agents and processing aids.

15. A process for the production of the mixture of claim 1 comprising premixing (a) and (b) in a ratio of 10:90 to 99:1 to form a blend, and homogeneously mixing (a) and (b) as a melt at temperatures which are not higher than 10° C. below the decomposition point of said starch and not lower than 50° C. above the melting point of said polyamide to form a composition.

16. The mixture of claim 1 wherein (b) is an aliphatic polyamide having a melt flow index of 100 to 5000 Pa.s at 160° C. and 21.2 N.

17. The mixture of claim 16 wherein said polyamide is a homopolyamide or copolyamide of at least one monomer selected from the group consisting of aminocarboxylic acids, lactams having 6 to 12 carbon atoms, aliphatic diamines having 1 to 6 carbon atoms with linear dicarboxylic acids having 2 to 12 carbon atoms, and mixtures thereof.

18. A co-extruded film consisting essentially of at least one layer of the mixture of claim 1 and a further layer of at least one additional polymer other than said starch mixture with a melting or softening point of 50° to 160° C.

19. The film of claim 18 wherein said additional polymer is at least one member selected from the group consisting of polyamides, polyesters, and polyolefins.

20. A film of claim 18 wherein said starch layer is a middle layer with an upper layer and a lower layer of said additional polymer.

21. The film of claim 18 wherein said starch mixture is in an upper layer and/or a lower layer.

22. A highly transparent, single phased and biologically degradable starch mixture comprising
   (a) 10 to 99 parts of a starch molding composition comprising,
      (i) 96 to 46 parts of at least one chemically modified starch,
      (ii) 4 to 40 parts of at least one plasticizer,
   (b) 90 to 1 parts of at least one aliphatic polyamide having a melting point of 50° to 160° C., and
   (c) 0 to 20 parts of additives, the sum of a+b+c being 100 parts,
   wherein said starch is a hydroxy alkyl, acetyl, or carbamate starch, or mixtures thereof, said alkyl having 2 to 6 carbon atoms.

* * * * *